United States Patent [19]
Ruether et al.

[11] Patent Number: 6,052,412
[45] Date of Patent: Apr. 18, 2000

[54] CODEC SUPPORTING PCM MODEM COMMUNICATIONS OVER A UNIVERSAL DIGITAL LOOP CARRIER

[75] Inventors: Peter Gade Ruether, Longmont; Carolyn Gaye Ford, Louisville, both of Colo.

[73] Assignee: Tyco Electronics Corporation, Middletown, Pa.

[21] Appl. No.: 09/326,355

[22] Filed: Jun. 4, 1999

Related U.S. Application Data

[63] Continuation-in-part of application No. 09/183,709, Oct. 30, 1998.

[51] Int. Cl.[7] .............................. H03H 7/30; H04B 14/04
[52] U.S. Cl. ........................ 375/231; 375/242; 375/350
[58] Field of Search ..................................... 375/222, 254, 375/242, 285, 231, 346, 219, 350; 379/93.01, 93.05, 93.06

[56] References Cited

U.S. PATENT DOCUMENTS

| | | | |
|---|---|---|---|
| 4,646,289 | 2/1987 | Tsiakas et al. | 379/93.01 |
| 5,394,437 | 2/1995 | Ayanoglu et al. | |
| 5,528,625 | 6/1996 | Ayanoglu et al. | |
| 5,801,695 | 9/1998 | Townshend | 375/242 |
| 5,875,229 | 2/1999 | Eyiuboglu et al. | 375/222 |

OTHER PUBLICATIONS

Ender Ayanoglu et al., "An Equalizer Design Technique for the PCM Modem: A New Modem for the Digital Public Switched Network," IEEE Transactions on Communications, Jun. 1998, pp. 763–774, vol. 46, No. 6.

*Primary Examiner*—Tesfaldet Bocure
*Attorney, Agent, or Firm*—Dorr, Carson, Sloan & Birney, P.C.

[57] ABSTRACT

A codec supports PCM modem communications (e.g., V.90, X2, or K56flex protocols) over a universal digital loop carrier (UDLC) having an analog interface to the central office (CO). The codec includes an analog-to-digital converter (ADC) that is synchronized to the CO clock, and an equalizer that has been trained to provide a transfer function to compensate for the distortion introduced by the CO line interface reconstruction filter and connecting circuits, to minimize resampling error. These features allow the codec to output a PCM stream that accurately reproduces the PCM data at the central office, at data rates sufficient to support PCM modem communications, as well as voice and conventional modem communications. The equalizer can be trained using a remote training unit that transmits a predetermined sequence of training signals to the equalizer. The connection to the training unit can be over a local central office telephone call or over a wide area network that can be accessed through a switched connection. In one embodiment, the equalizer comprises a feed-forward linear equalizer followed by a decision feedback equalizer.

18 Claims, 9 Drawing Sheets

(Digital Loop Carrier – Prior Art)

(Digital Added Main Line – Prior Art)

CODEC SUPPORTING PCM MODEM COMMUNICATIONS OVER A UNIVERSAL DIGITAL LOOP CARRIER

RELATED APPLICATION

The present application is a continuation-in-part of the Applicants' co-pending U.S. patent application Ser. No. 09/183,709, entitled "Codec Supporting PCM Modem Communications Over A Universal Digital Loop Carrier," filed on Oct. 30, 1998.

BACKGROUND OF THE INVENTION

1. Field of the Invention

The present invention relates generally to the field of telephony. More specifically, the present invention discloses a codec for supporting PCM modem communications and conventional voice communications over a universal digital loop carrier.

2. Statement of the Problem

PCM Modem Communications. Various types of PCM modem communications have gained wide acceptance in recent years in response to the limited data transfer rates that are possible with analog modems. For example, the V.90 protocol adopted by the International Telecommunications Union (ITU) provides a specification for downstream modem data transfer rates up to 56 Kbps over the standard public switched telephone network (PSTN). It should be noted that the terms "public switched telephone network" or "PSTN" are used herein as these terms are commonly used in the United States to refer generally to the digital network between telephone company central offices. V.90, X2, K56flex, and other PCM modem systems overcome the limitations imposed on previous analog modems by exploiting the digital connection that most data service providers and internet service providers (ISPs) use at their end to connect to the PSTN.

The PSTN was designed for voice communications. By artificially limiting the sound spectrum to just those frequencies relevant to human speech understanding, the required bandwidth for each voice channel could be reduced, thereby increasing the number of voice channels that can be handled simultaneously when multiplexing is used. While this works well for voice communications, it imposes limits on data communications. In particular, existing V.34 modems that use conventional phase and amplitude modulation are optimized for the situation where both ends connect by analog lines to the PSTN, and are based on the assumption that both ends of the connection suffer impairment due to quantization noise introduced by analog-to-digital converters (ADCs).

The ADC samples the incoming analog waveform 8,000 times per second and outputs a pulse code modulation (PCM) code for each sample. The sampling system uses 256 discrete 8-bit PCM codes. The PCM codes sent across the PSTN can only approximate the original analog waveform because the sample values must be one of the 256 discrete codes. The amplitude difference between the original waveform and the reconstructed quantized waveform is called quantization noise.

Quantization noise and other impairments limit V.34 communications to about 35 Kbps. However, quantization noise affects only analog-to-digital conversion, not digital-to-analog conversion, which results in the principal advantage of the PCM modem protocols. FIG. 1 provides a diagram of a typical V.90 communications configuration. The high speed data direction for V.90 modems is from the central server modem 11 to the subscriber modem 14 (i.e., left to right in FIG. 1). The server modem 11 could be a gateway to an internet service provider (ISP) as this example shows. If there are no analog-to-digital conversions between the V.90 digital modem 11 and the PSTN 12, and since the V.90 digital modem uses only the 256 discrete PCM codes available on the digital portion of the phone network, then this exact digital information reaches the subscriber's CO line interface 13, and can be correctly decoded by the subscriber's analog modem 14, without information being lost in the conversion process. The encoding process in the server modem 11 uses only in most instances the 256 PCM levels (or a subset) used in the digital portion of the phone network. This significantly reduces the quantization noise that would be associated with an analog-to-digital conversion. The PCM codes are converted at the local telephone company's central office (CO) 13 to an analog signal that is sent to the subscriber's analog modem via a copper pair. The subscriber's analog modem 14 reconstructs the PCM codes from the analog signals it receives, decoding what the ISP 11 sent with no resulting loss of information.

Eight bit PCM codes are transmitted by ISP's V.90 digital modem 11 at the rate of the 8000 codes per second, so that the ISP modem's symbol rate is equal the phone network's sample rate. At the subscriber's end, the V.90 analog modem 14 must discriminate among the 256 analog voltages to recover the PCM codes (symbols). If this could be done at a rate of 8000 codes per second, the resulting download speed would be 64 Kbps (8000×8 bits per code). However, this is not often possible. Even though the quantization noise problem is removed, other noise sources exist. These arise principally from thermal noise, switching noise, and crosstalk. In addition, network DACs are not linear, but follow a non-linear conversion rule ($\mu$-law in North America and A-law elsewhere) with very small step sizes near zero. These problems can make it impractical to use all 256 discrete codes, because the corresponding DAC output voltage levels near zero are too closely spaced to accurately represent data on an analog loop having a degree of noise. Therefore, the V.90 encoder uses various subsets of the 256 codes to eliminate detection errors between DAC output signals most susceptible to noise. Furthermore, the output of the DAC is band limited to about 3500 Hz by a reconstruction filter and connecting circuits that reduce the channel capacity (twice the available bandwidth) to approximately 7000 symbols per second. The limited bandwidth makes the symbols more difficult to distinguish from one another, a problem due to inter-symbol interference, or ISI. Therefore, the V.90 downstream modulator interleaves symbols periodically that contain lower information content, but serve to mitigate ISI.

The V.90 protocol is asymmetrical. As previously discussed, the V.90 protocol is capable of downstream data rates of 56 Kbps because little information is lost in the digital-to-analog conversion. However, upstream communications go through an analog-to-digital conversion in the telephone company central office line interface, which under V.90 does not have the ability to support PCM symbols and thus limits the channel to lower data rates. For this reason, V.90 modems limit upstream communications to V.34 speeds.

Digital Loop Carriers (DLC). Communications from the local-telephone central office (CO) to the subscriber's premises have traditionally been carried over a pair of copper wires using analog signals. This is commonly referred to as an "analog loop." In recent years, several types of situations have arisen that require extending digital communications beyond the central office. For example, where a group of subscribers 26–29 are geographically close to one another but relatively remote from the central office, the local exchange carrier may extend a digital carrier or a digital subscriber line (DSL) 25 from the central office to a remote terminal 24 in the subscriber's area, as illustrated in FIG. 2. Communications over the digital facility are handled using any of a number of standard digital protocols (e.g., T1 or T3). Analog loops are then extended from the remote terminal 24 to each of the subscribers 26–29 in the carrier service area. When dealing with a large number of subscribers (e.g., up to 1000 or more), this type of system is commonly known as a digital loop carrier or DLC. Smaller configurations are sometimes referred to as a "mini DLC."

The universal DLC (or UDLC) shown in FIG. 2 works well for voice communications and is satisfactory for data communications at V.34 speeds or lower. But, this type of DLC is incapable of V.90 communications due to the analog or "universal" interface between the central office switch 21 and the central office terminal 22 (COT) at the headend of the digital facility. As previously discussed, this analog interface requires an analog-to-digital conversion at the CO terminal 22 resulting in quantization noise. The analog interface is largely the result of the historical design for CO switches, that were based on directly providing analog loops to individual subscribers 23. Many newer CO switches are capable of providing a digital interface for a DLC, but many existing switches are not, and would require expensive retrofitting or replacement.

Subscriber Line Multiplexer. Another related situation arises when a subscriber wants to add a second or third telephone line to accommodate a fax or modem. The local exchange carrier has a limited number of wire pairs in each geographic area and installing new wires is often very expensive. To address this problem, a subscriber line multiplexer, universal digital carrier (UDC), or digital added main line, can be used to provide additional lines over a single pair of wires as depicted in FIG. 3. Here again, a digital facility, in this case a DSL 35, is extended from the central office to a remote terminal (RT) 34 typically located on the subscriber's premises. Several analog loops extend from the RT 34 for telephone 36, fax, or modem 37 connections. Communications for each of the analog loops are multiplexed over the DSL 35 using any of a number of standard digital communications protocols (e.g., 2B1Q). One type of subscriber line multiplexer is commercially available from Raychem Corporation under the name MINI-PLEX™. Here again, the problem is the analog interface between the CO switch 31 and the central office terminal 32 (COT) at the headend of the DSL 35. This analog interface requires an analog-to-digital conversation at the COT 32, resulting in quantization noise.

Due to their conceptual similarities, a subscriber line multiplexer may be considered to be a type of DLC. Any references throughout the remainder of this application to DLCs should be interpreted as including subscriber line multiplexers. The problem addressed here is often aggravated in the case of a subscriber line multiplexer since these systems are frequently installed to provide a second line for use with a modem.

A subscriber line multiplexer can be connected by an analog interface to a central office switch 31, as illustrated in FIG. 3. Alternatively, a subscriber line multiplexer can be used at the remote end of a DLC to provide an additional telephone line from the DLC remote terminal to a subscriber in the carrier service area. Here again, a subscriber line multiplexer could be connected by an analog interface to the DLC remote terminal. This would result in two analog-to-digital conversions in the downstream path. The first occurs at the CO terminal of the DLC, and the second occurs at the CO terminal of the subscriber line multiplexer.

Other Related Art. Other related art in the field includes the following:

| Inventor | Patent No. | Issue Date |
|---|---|---|
| Ayanoglu et al. | 5,394,437 | Feb. 28, 1995 |
| Ayanoglu et al. | 5,528,625 | June 18, 1996 |

Ayanoglu et al., "An Equalizer Design Technique for the PCM Modem: A New Modem for the Digital Public Switched Network," *IEEE Transactions on Communications*, vol. 46, no. 6, pages 763–774 (June 1998).

U.S. Pat. No. 5,494,437 (Ayanoglu et al.) discloses a high-speed modem synchronized to a remote codec. The modem operates reliably at symbol rates up to twice its bandwidth when it is controlled by the clock of the receiving ADC.

U.S. Pat. No. 5,528,625 (Ayanoglu et al.) discloses a quantization-level-sampling (QLS) modem that includes means for separately equalizing each loop in an end-to-end digital telephone system network connection by employing a plurality of transmitter filters and a plurality of receiver filters in such a way that, in the upstream direction, the voltage samples seen by the codecs are equivalent to the network quantization levels transmitted by the modem, and in the downstream direction, the voltage samples seen by the modem are equivalent to the network quantization levels encoded by the codecs. These patents by Ayanoglu et al. relate to the fundamental principles employed in V.90 and other PCM modems and contribute to the understanding of the issues in the present disclosure.

The article by Ayanoglu et al. in *IEEE Transactions on Communications* discuss equalization techniques for use with PCM modems.

3. Solution to the Problem

The present invention solves the problem of providing PCM modem communications over a DLC having an analog interface to the central office. In particular, the present invention accomplishes this by employing a codec in the CO terminal that includes at least one adaptive equalizer and synchronizing the codec to the CO clock to minimize resampling error. The CO line interface and codec are typically housed within the same building at the central office and are located a relatively short distance from the CO switch. This results in an environment that is relatively noise-free and unchanging, so that adaptive training is only infrequently required. These features allow the codec to accurately recreate PCM codes at data rates sufficient to support V.90, X2, and K56flex communications, and also to support conventional voice communications and data communications. More generally, the present invention can be used whenever PCM coding is used in communications.

SUMMARY OF THE INVENTION

This invention provides a codec capable of supporting voice, conventional modem, and PCM modem communications (e.g., V.90, X2, or K56flex protocols) over a universal digital loop carrier (UDLC) having an analog interface to the central office (CO). In the downstream direction, the codec, which has been synchronized to the CO clock, includes an anti-aliasing filter, an analog-to-digital converter (ADC), and an equalizer that has been trained to compensate at the sampling times for the distortion introduced by the downstream channel. The equalizer can be trained using a remote training unit connected to the central office (either directly or through the digital network) that transmits a predetermined sequence of training signals to the equalizer. The training unit may be remote to the central office but may be connected to it through a digital link. The specific line card being trained can access the training unit by placing a call to the phone number associated with the training unit. In one embodiment, the equalizer comprises a feed-forward linear equalizer followed by a decision feedback equalizer.

These features allow the codec to output a PCM stream that accurately reproduces the PCM data at the central office, at data rates sufficient to support V.90 communications. These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
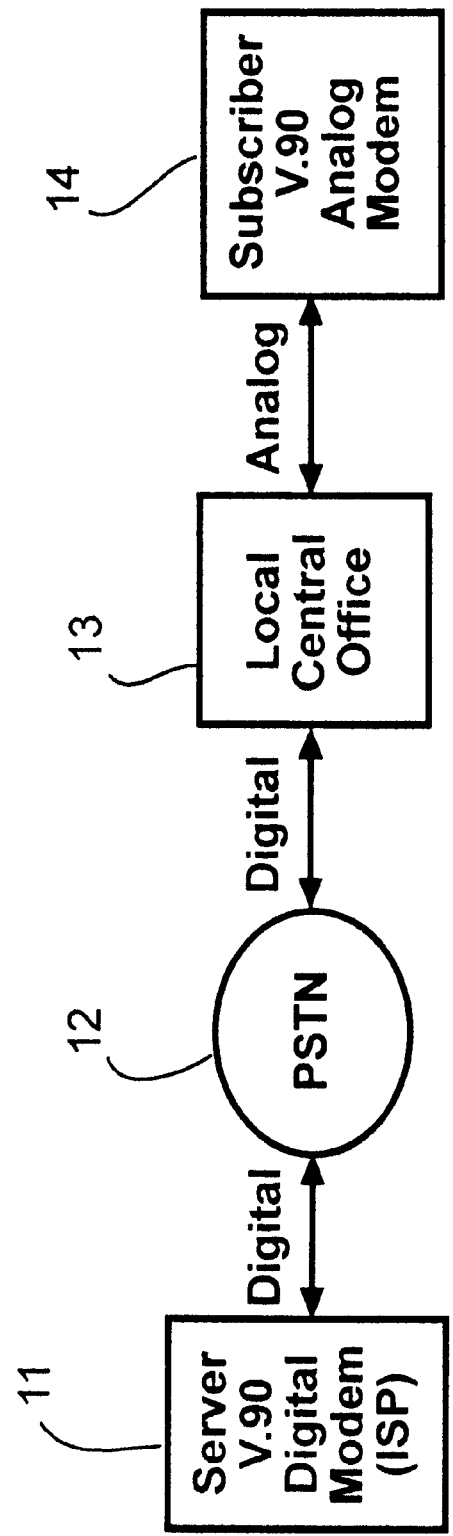
FIG. 1 is a simplified block diagram of telecommunications from an internet service provider (server) to a subscriber using the V.90 protocol.
Figure 2:
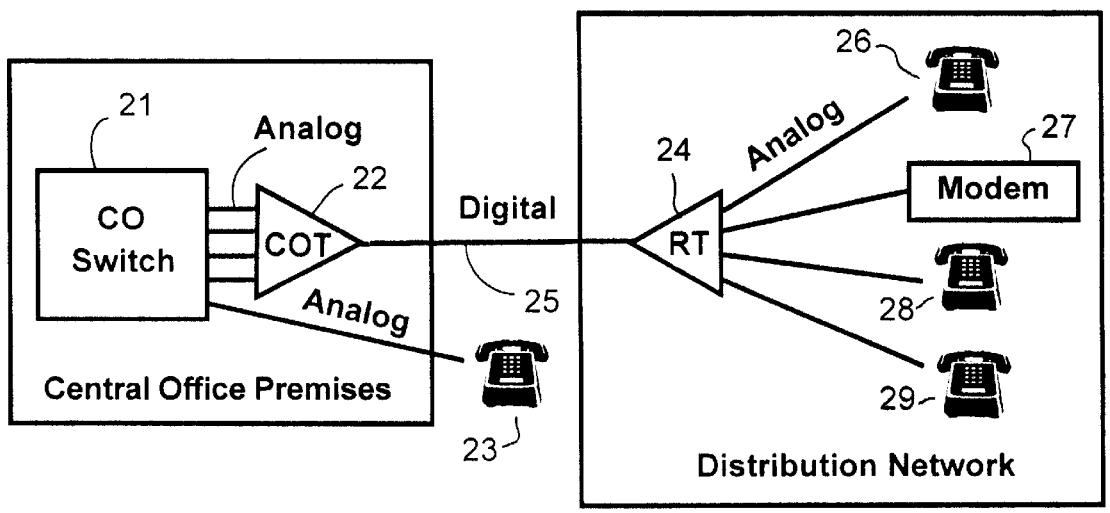
FIG. 2 is a simplified block diagram of a digital loop carrier (DLC).
Figure 3:
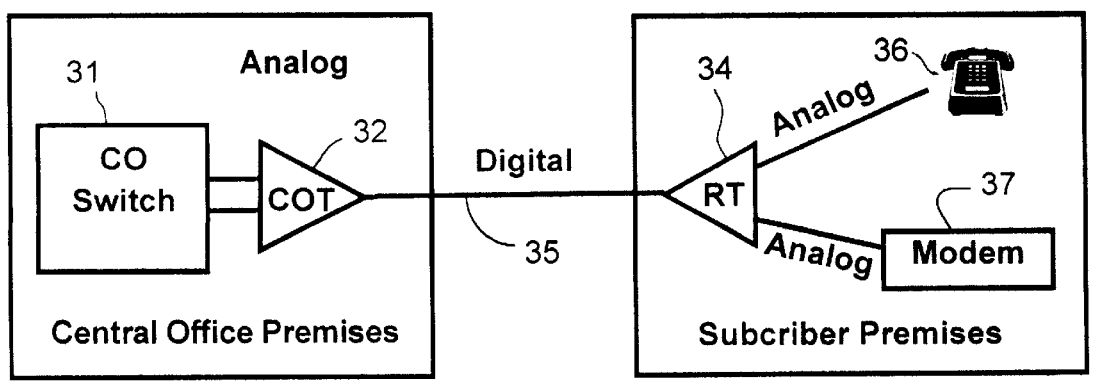
FIG. 3 is a simplified block diagram of a digital added main line, or subscriber line multiplexer.
Figure 4:
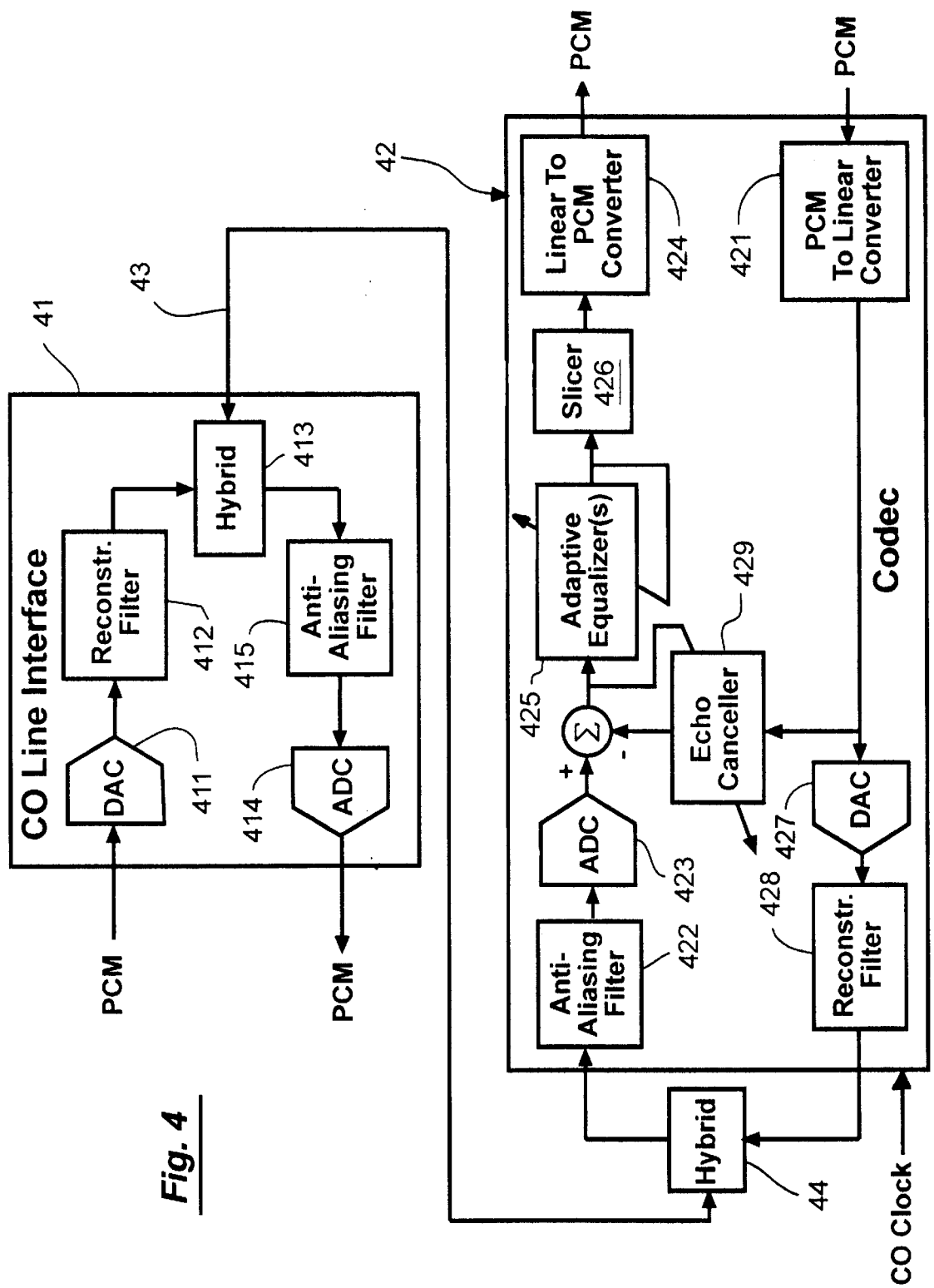
FIG. 4 is a block diagram of the present codec 42 interfaced to a CO line interface 41.
Figure 8:
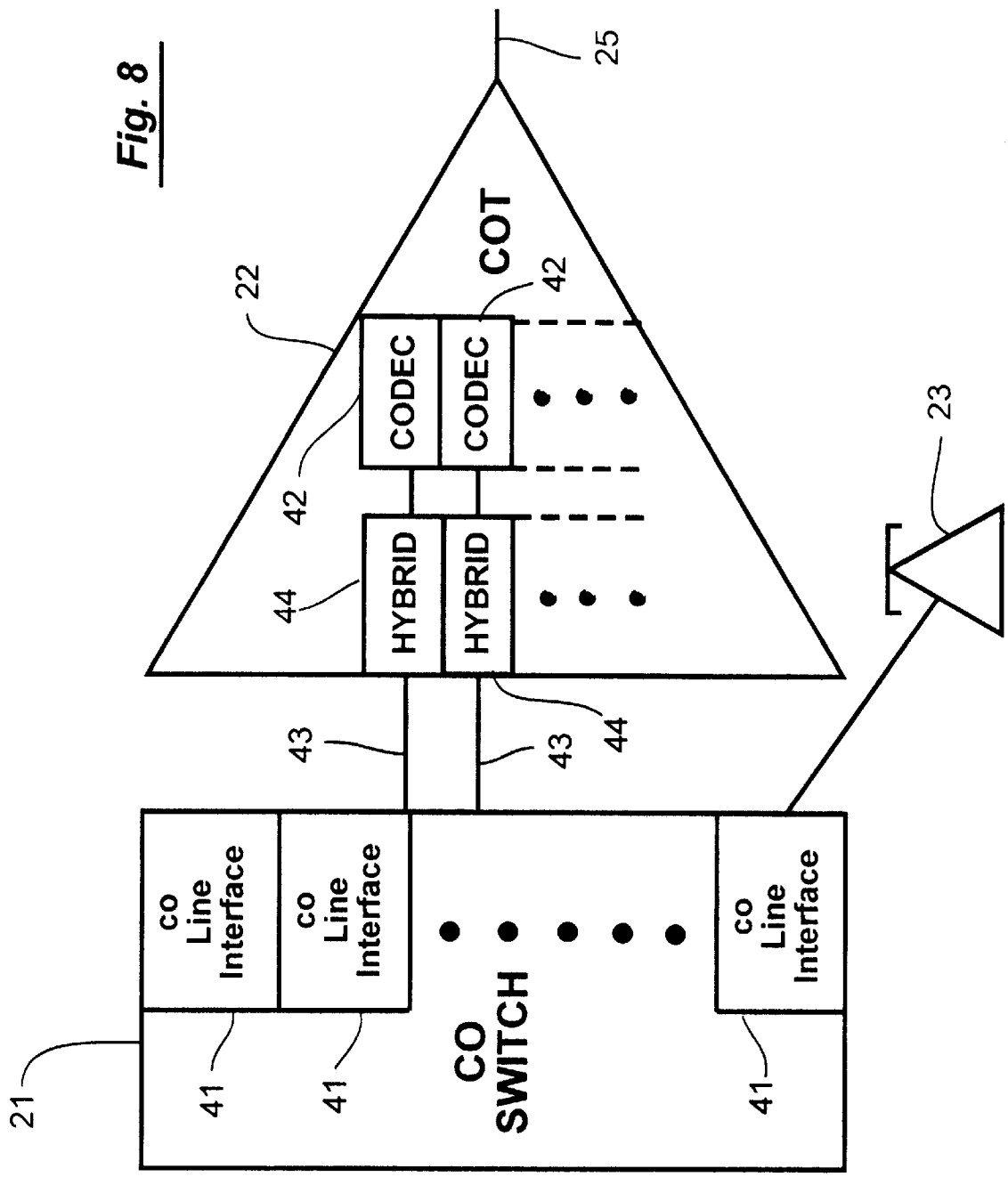
FIG. 8 is a block diagram of the present codec 42 interfaced to a CO line interface 41 showing where these elements reside in a typical telephone network.

Turning to FIG. 4, a schematic diagram is provided showing the present codec 42 connected to a central office line interface 41. FIG. 8 is a block diagram of the codec 42 interfaced to a CO line interface 41 showing where these elements reside in a typical telephone network employing subscriber line multiplexers. The CO line interface 41 is conventional in design, and is widely used to provide an analog or universal interface between a digital central office switch and an analog loop extending to the subscribers premises. A CO line interface 41 can also be used to interface the CO terminal of a DLC as shown in FIG. 2, or the CO terminal of a subscriber line multiplexer, as previously described with regard to FIG. 3. In either case, the CO line interface 41 receives pulse code modulated (PCM) signals from the CO switch matrix that are converted to analog voltages by a digital-to-analog converter (DAC) 411. The analog signal passes through a reconstruction filter 412. A hybrid 413 is used to both send and receive analog signals over a single conventional pair of wires 43. The received analog signal is band-limited by an anti-aliasing filter 415. The filtered signals are sampled and converted into digital data by an analog-to-digital converter 414 (ADC), and output to the CO switch matrix. It should be noted that the CO line interface 41 samples synchronously with the CO clock. This clock is used, for example, by both the DAC 411 and ADC 414.

The codec 42 connects to the CO line interface 41 over the wire pair 43 by means of its hybrid 44. Downstream analog signals pass through an anti-aliasing filter 422 and are converted into digital signals by an analog-to-digital converter (ADC) 423. This ADC 423 is preferentially controlled by the same CO clock used by the CO line interface 41 to ensure that it has precisely the same sampling rate (or a multiple of the sampling rate) and a constant phase relationship with respect to the framing signal used by the DAC 411 in the CO line interface 41. This is usually possible if the codec 42 is located adjacent to the CO line interface 41 by means of a common timing signal. In this case, the length of wire pair 43 connecting the CO line interface 41 and the codec 42 is typically only a few hundred feet, at most. This creates a predictable environment with low noise that is capable of supporting communications with a high signal-to-noise ratio. The CO clock rate and phase can be inferred by detecting periodic amplitude patterns in the analog signals received from the CO line interface 41 or by using non-linear spectral analysis techniques. Methods for estimating the clock from the incoming analog signal in a multilevel PAM system are well understood in the art. Several methods may be employed, some of which are described by Proakis, *Digital Communications*, pages 358–365 ($3^{rd}$ edition, McGraw Hill, Inc., 1995), which is hereby incorporated by reference.

Figure 5:
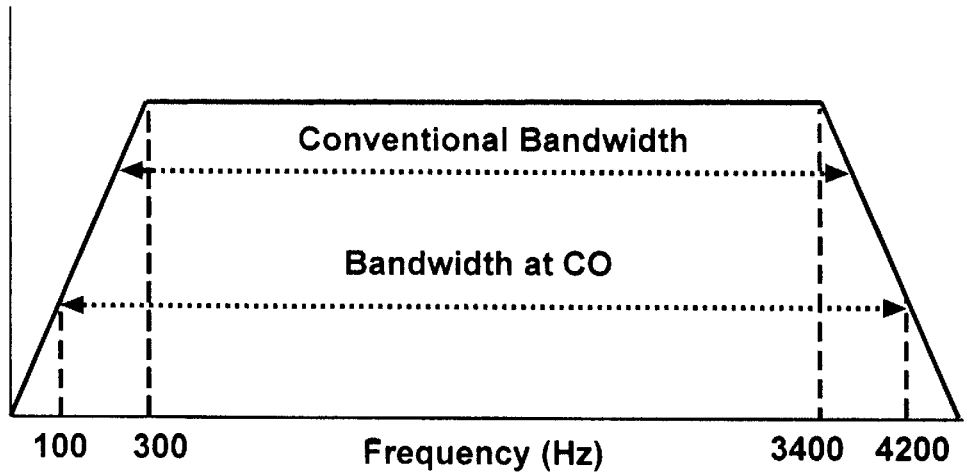
FIG. 5 is a conceptual graph comparing the useable bandwidth available to a conventional subscriber modem, with the bandwidth available to the present codec at the central office.

Conventional analog telephone communications systems assume a band from about 300 to 3500 Hz depending on local conditions, as shown conceptually represented in FIG. 5. However, the close proximity and controlled environment between the CO line interface 41 and the codec 42 in the present invention increases the useable bandwidth available for communications to about 4 KHz, and even more if you use the information in the signal beyond the cutoff frequency of the filter. When viewed in terms of either the Shannon capacity formula or the Nyquist limit, the analog connection between the CO line interface 41 and the codec 42 is therefore capable of supporting data rates sufficient for V.90 communications, and beyond.

The output signal from the ADC 423 is then processed by at least one adaptive equalizer 425. In the simplest embodiment, the equalizer 425 has previously been trained to provide a transfer function that substantially compensates for distortions introduced by the reconstruction filter 412 and the signal path between the codec 42 and the reconstruction filter 412. The output of the adaptive equalizer 425 is sampled by a slicer 426 and converted into the nearest linearized PCM value. The slicer 426 is also synchronized to the CO clock to minimize resampling error. The digital data output by the slicer 426 undergoes conversion by a linear-to-PCM converter 424 ($\mu$-law companding in North America and Japan, A-law companding elsewhere) to generate PCM codes for output over the DLC. This configuration allows the codec 42 to output a PCM stream that accurately reproduces the PCM codes entering the DAC 411 of the CO line interface 41.

The equalizer should be initially trained prior to entering operational mode. This involves having a known training sequence sent through the channel and the equalizer 425, and comparing the equalizer output to the expected sequence. The equalizer filter taps are then adjusted based on an adaptive process such as the least-mean squares (LMS) algorithm to minimize error. This algorithm is widely used in the telecommunications industry and is discussed by Widrow et al., *Adaptive Signal Processing*, Prentice Hall, Englewood Cliffs, N.J. (1985). After the training period, the equalizer 425 taps could be frozen for normal communications or could continue to adapt in a decision directed manner. Equalizer training can be repeated, as necessary, to compensate for changes in line conditions and the CO line interface 41.

Figure 6:
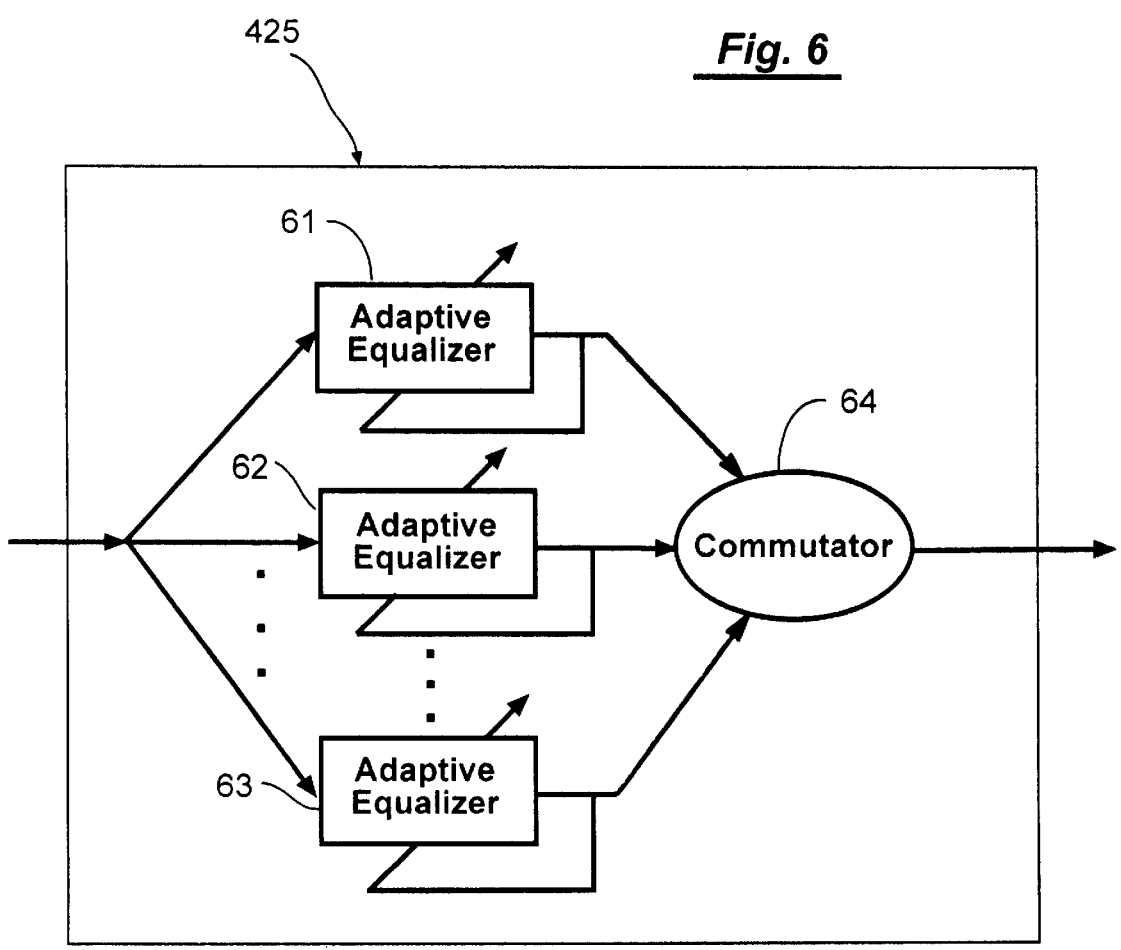
FIG. 6 is a block diagram of an array of adaptive equalizers 61–63 that can be used in place of a single equalizer 425 in the present codec.

FIG. 6 illustrates an alternative embodiment in which a plurality of adaptive equalizers 61, 62, . . . 63 are arranged in parallel in place of the single equalizer 425 shown in FIG. 4. Each of the equalizers in the array 61–63 is trained to process one symbol in each frame of N symbols from the ADC 423. This approach is discussed in detail by Ayanoglu et al. in *IEEE Transactions on Communications*, supra, which is hereby incorporated by reference.

Alternatively, the equalizer(s) 425 shown in FIG. 4 can be implemented as a feed-forward linear equalizer (LE) followed by a decision feedback equalizer (DFE), which operates on the error from the feed-forward linear equalizer. Furthermore, the feed-forward linear equalizer can be a fractionally-spaced equalizer. This means that the input data rate is a multiple (e.g., two) of the output data rate. In other words, the training algorithm is executed only at every-other data shift (i.e., two input samples are shifted in, the LMS training algorithm is executed, and one output sample is produced). The DFE has been found to be useful in compensating for low frequency attenuation in the connection between the local central office and the codec 42. The DFE trains by taking the error signal sequence from the LE and adjusting its taps to produce an output matching the next error signal sample.

Returning to FIG. 4, upstream digital signals received by the codec 42 from the DLC pass through a PCM-to-linear converter 421, which linearizes the code space of the companded PCM received from the DLC. The linearized digital output from the PCM-to-linear converter 421 is converted into analog voltages by a digital-to-analog converter (DAC) 427. The resulting analog signal passes through a reconstruction filter 428 and is transmitted upstream to the CO line interface 41 over the wire pair 43 by the codec's hybrid 44. The upstream digital signal is also used by an echo canceller 429 to generate an echo estimate signal that is subtracted from the output of the ADC 423 to mitigate echo leaking through the hybrid 44.

Figure 7:
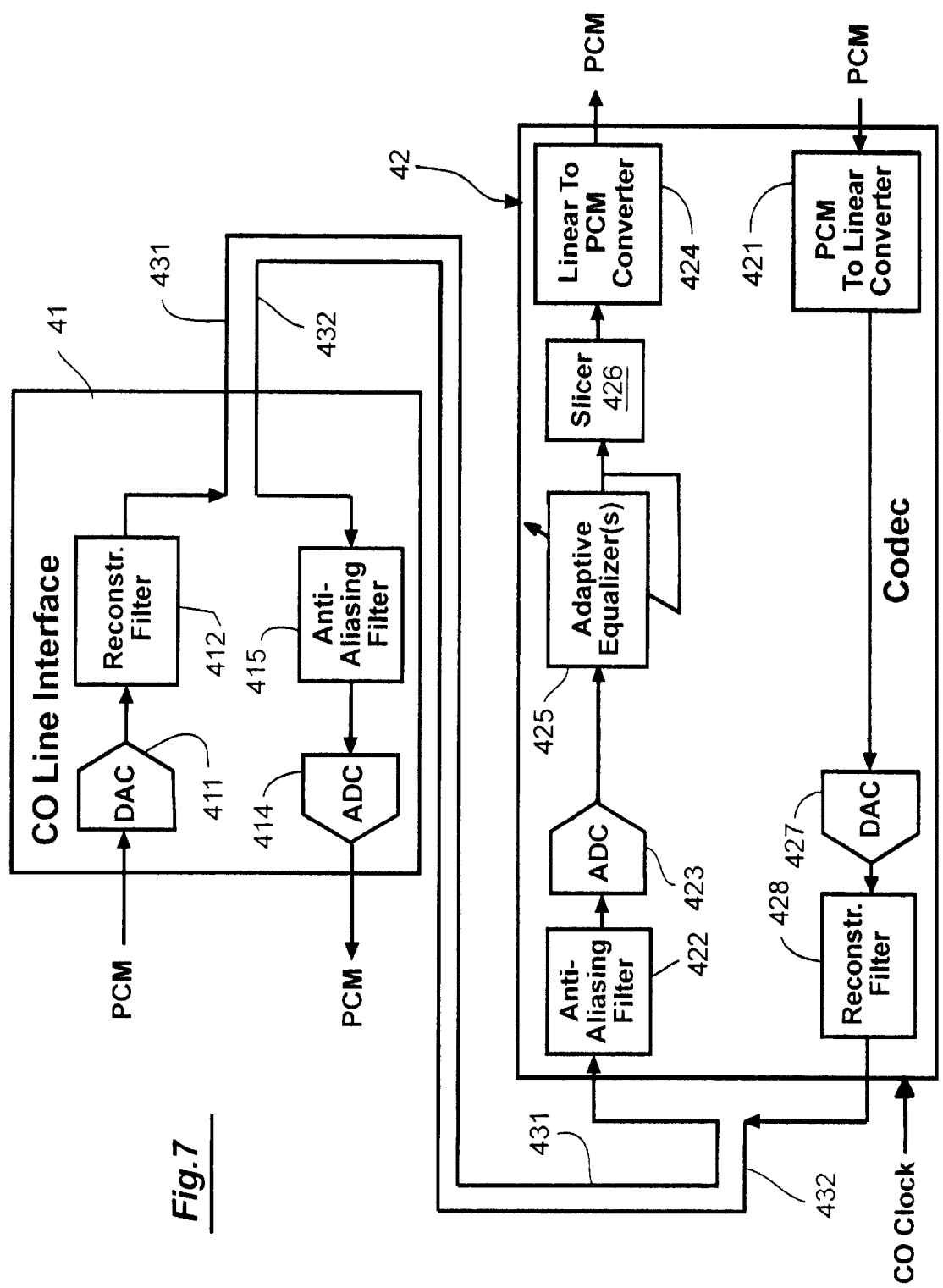
FIG. 7 is a block diagram of an alternative embodiment of the codec 42 using a four-wire interface to the CO line interface 41.

FIG. 7 is a schematic block diagram of an alternative embodiment of the present invention in which the two-wire interface 43 between CO line interface 41 and codec 42 has been replaced with an analog four-wire interface 431 and 432. One pair of wires 431 is used for downstream communications and the second pair 432 is used for upstream communications. This embodiment allows both of the hybrids 413 and 44 and the echo canceller 429 shown in FIG. 4 to be eliminated.

The preceding discussion has focused on use of the present invention in facilitating PCM modem communications. It should be noted that the present codec can also be employed to improve the performance of voice and earlier modems (V.34 and before) by more accurately reproducing the PCM stream at the COT of the DLC.

The present codec could also be used in the CO line interface to facilitate the accurate reproduction of PCM codes in the upstream direction. For example, this implementation could be used to enable PCM modem data transport in the upstream direction.

Figure 10:
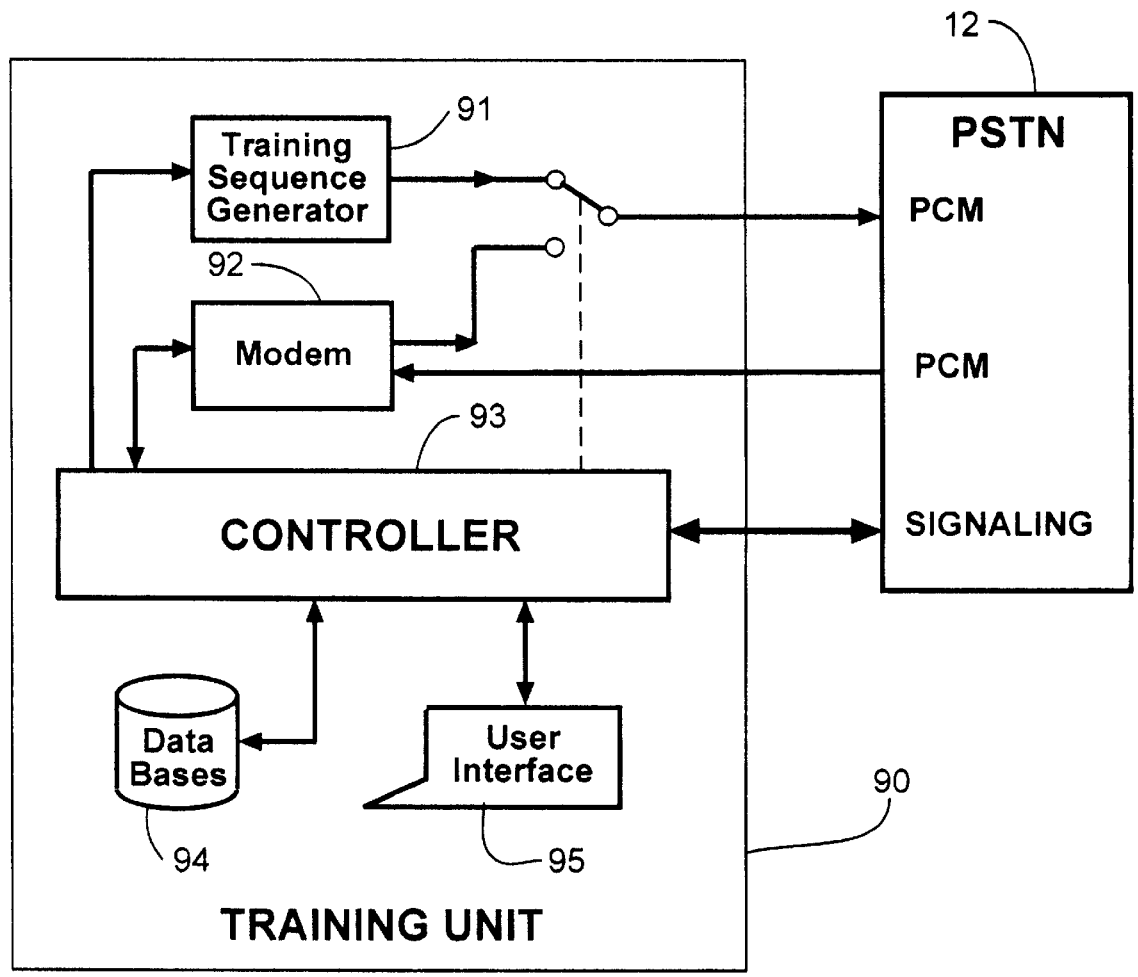
FIG. 10 is a block diagram of the training unit 90.
Figure 11:
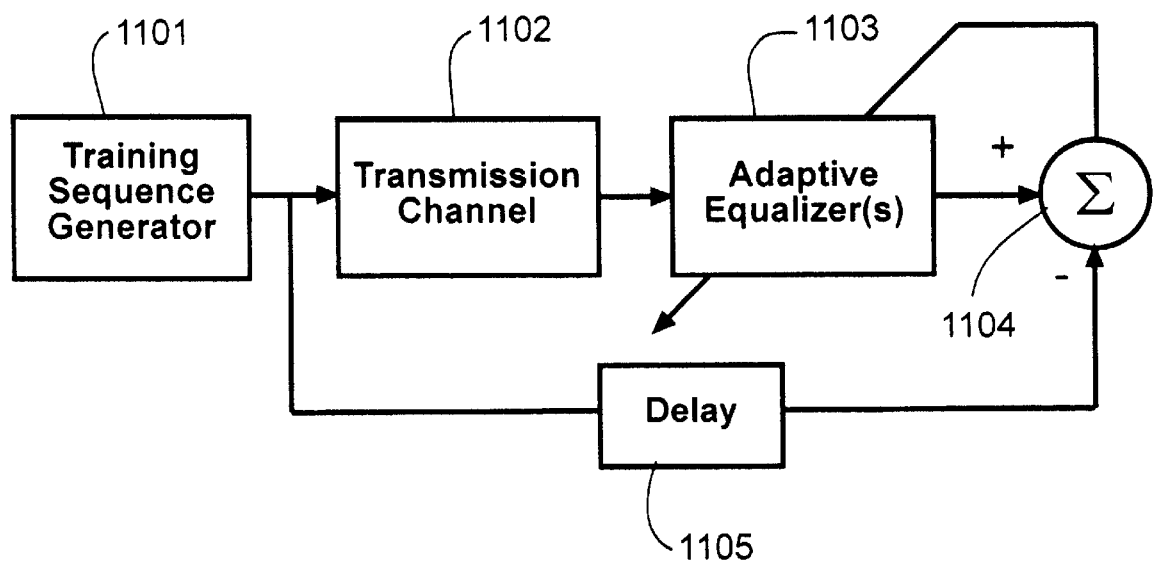
FIG. 11 is a schematic overview of the training process for an adaptive equalizer 1103.

Remote Training of the Adaptive Equalizer(s). FIGS. 9–12 relate to an embodiment of the present invention that employs a remote training unit 90 to train the adaptive equalizer(s) 425 in the codec 42. FIG. 11 is a schematic overview of the training process, in general, for an adaptive equalizer 1103. This training process shown in FIG. 11 must be initially applied to the adaptive equalizer(s) 425 in the present codec 42 (as shown in FIG. 4) prior to entering operational mode. As illustrated in FIG. 11, this is typically done by a training sequence generator 1101 that sends a known training sequence of PCM symbols through the downstream channel 1102 to the equalizer 1103. The equalizer output is then compared against the expected sequence. For example, a subtractor 1104 can be used to compare the output of the equalizer 1103 against the original training sequence (after it has been subject to a time delay 1105 to compensate for propagation delays through the transmission channel 1102 and the delay line of the equalizer 1103). The error signal from the subtractor 1104 is fed back to the equalizer 1103. The equalizer filter taps are then adjusted based on an adaptive process such as the least-mean squares (LMS) algorithm to minimize error. After completion of the training sequence, the equalizer 425 taps could be frozen for normal operation of the codec. Equalizer training can be repeated, as necessary, to compensate for changes in line conditions and the CO line interface 41.

Figure 9:
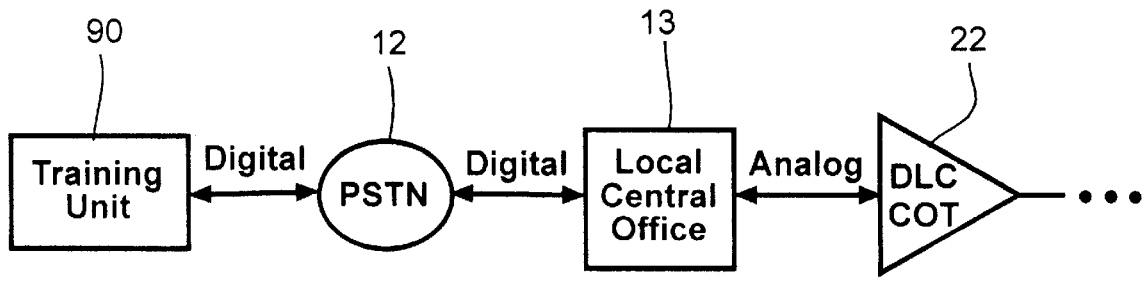
FIG. 9 is a simplified block diagram of telecommunications from a training unit 90 through the public switched telephone network 12 (PSTN) and local central office 13 to a DLC central office terminal 22 (COT) containing the present codec.

FIG. 9 is a simplified block diagram of telecommunications from the training unit 90 through the public switched telephone network 12 (PSTN) and local central office 13 to a DLC central office terminal 22 containing the codec 42. Alternatively, the training unit can be part of, or directly connected to the local central office 13. FIG. 10 is a corresponding block diagram of the remote training unit 90. The training unit 90 generally includes a training sequence generator 91 that outputs a predetermined sequence of PCM codes for training, and a modem 92 that enables bidirectional data communications between the training unit 90 and the codec 42. The training unit 90 is controlled by a controller 93 (e.g., a microprocessor or personal computer) that includes a user interface 95. The controller can also store and retrieve data from a number of databases 94, as will be discussed in detail below. The controller also handles control signaling (e.g., on-hook, off-hook) with the PSTN 12.

In training mode, any codec 42 on the PSTN 12 can establish a communications link with the training unit 90 by means of a conventional dial-up connection initiated by the codec 42 to the training unit 90. The training unit 90 receives the incoming call from the codec 42 and answers. The dial-up connection could be a toll-free number preprogrammed into the codec 42. Alternatively, it could be a phone number provided by the owner of the codec 42. In another alternative, the appropriate dial-up number can be downloaded to the codec 42 by the training unit 90, which can be programmed to recognize specific codecs by their serial numbers.

Once a communications link has been established as shown in FIG. 9, the training unit 90 transmits a training preamble (e.g., a tone followed by a period of silence) followed by a predetermined sequence of PCM symbols over the PSTN 12 to the local central office 13. As with any incoming PCM data, the training sequence is converted from digital data into an analog signal by the DAC 411 in the CO line interface 41, as shown in FIG. 4. The analog signal passes through the reconstruction filter 412 and hybrid 413 and is transmitted over the wire pair 43 to the DLC COT 22.

Figure 12:
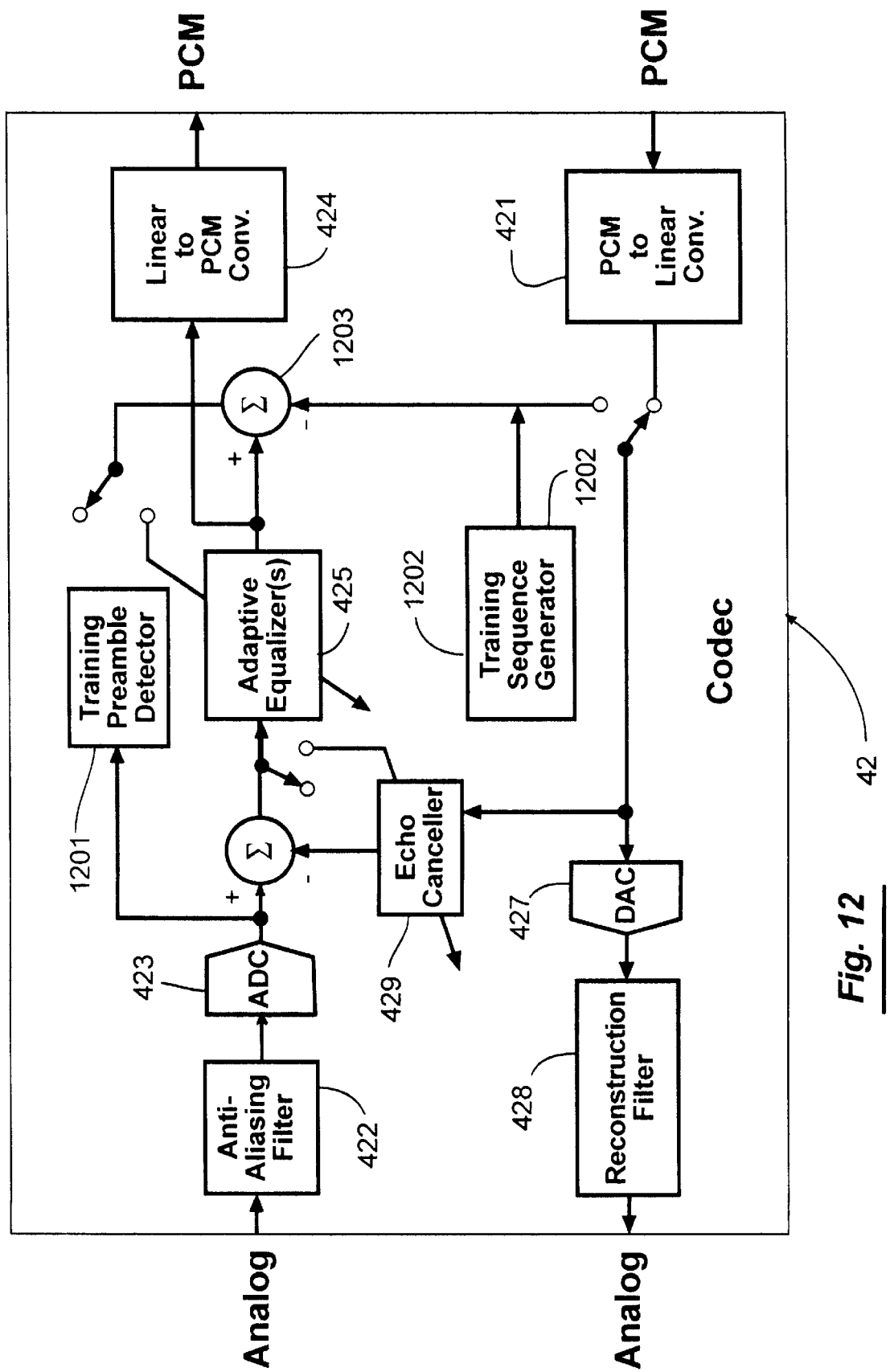
FIG. 12 is a block diagram of the present codec 42 showing the additional blocks used for training the adaptive equalizer 425.

At the codec 42 in the COT 22, as illustrated in FIG. 12, the training sequence passes through the hybrid 44 and anti-aliasing filter 422 and is converted back into digital data by the ADC 423. Thus, the training sequence is subject to the same distortions along the signal path as downstream PCM data during normal operation of the communications system. The codec's training preamble detector 1201 detects the training preamble and waits until the tone stops. The codec then waits an appropriate period of time for the silence in the training sequence to flow through and for the equalizer delay lines to fill with training data before starting the codec's training sequence generator 1202. The codec training sequence generator 1202 outputs the same sequence of PCM symbols as the remote training unit 90, subject to the start-up time delay provided by the training preamble detector 1201. The subtractor 1203 compares the output of the equalizer(s) 425 against the training sequence supplied by the codec training sequence generator 1202 and generates an error signal that is fed back to the equalizer(s). The equalizer proceeds with training using the conventional LMS algorithms for setting equalizer taps. When the entire training sequence has been processed by the equalizer, training stops and the equalizer taps are frozen. The codec 42 then terminates the telephone call to the training unit 90 and returns to its operational mode.

The remote training unit 90 can also be used to retrain the codec 42, either on a periodic basis or as needed due to changes in the downstream transmission channel. In order to retrain, the codec 42 switches out of operational mode and into training mode. As previously discussed, the codec 42 places a telephone call to the remote training unit 90, which transmits the training preamble and sequence of PCM symbols. The training preamble is detected by the codec's training preamble detector 1201, which then starts the codec's training sequence generator 1202 after an appropriate delay. The subtractor 1203 compares the output from the equalizer(s) 425 against the training PCM sequence and generates an error signal used to train the equalizer(s), as before. At the end of the training sequence, the equalizer taps are frozen, the communications link with the remote training unit 90 is terminated, and the codec returns to operational mode.

The equalizer can be provided with default values for its taps for use in the event that the codec is unable, for any reason, to establish an initial communications link with the remote training unit. These default tap values will probably not be optimal, but might be good enough for acceptable operation in many installations.

The equalizer(s) can be implemented in the form of dedicated hardware. However, in the preferred embodiment of the present invention, the equalizer(s) are implemented in software by a digital signal processor (DSP) controlled by a microprocessor. A DSP offers the advantages of high performance, reasonable cost, and programmability. This means that the DSP can be programmed not only to serve as an equalizer, but also to function as a modem for supporting data and control communications between the codec 42 and the modem 92 associated with the training unit 90. For example, modem communications can be used for uploading and downloading data and software for the DSP. The databases 94 maintained by the training unit 90 can be used to store a wide variety of information, such as serial numbers, call-back telephone numbers, software version information, subscriber statistics, and training statistics uploaded from each codec. The training unit databases 94 can also be used to store software upgrades to be downloaded to each codec 42.

The above disclosure sets forth a number of embodiments of the present invention. Other arrangements or embodiments, not precisely set forth, could be practiced under the teachings of the present invention and as set forth in the following claims.

We claim:

1. A codec supporting quantization level sampling (QLS) communications with a PCM modem over a digital loop carrier (DLC) having an analog connection to a central office (CO) line interface; said CO line interface having a digital-to-analog converter (DAC), a clock controlling the DAC, and a reconstruction filter; said codec also being switchably connected over the CO line interface to a training unit transmitting a predetermined sequence of training signals to said codec; said codec comprising:

an analog-to-digital converter (ADC) synchronized to the CO clock for converting analog signals from the CO line interface into corresponding digital signals;

an equalizer having an operational mode in which said equalizer receives said digital signals from said ADC and provides a transfer function to substantially compensate for distortions introduced by said CO line interface reconstruction filter and the signal path from said CO line interface reconstruction filter to said ADC; said equalizer also having a training mode in which said equalizer is connected to the training unit, receives the training signals, and adjusts predetermined equalizer parameters to more accurately compensate for said distortions; and a PCM converter converting the output of said equalizer to output digital data over said DLC that reproduces the digital data entering the CO line interface.

2. The codec of claim 1 wherein said equalizer comprises a feed-forward linear equalizer.

3. The codec of claim 2 wherein said feed-forward linear equalizer comprises a fractionally-spaced equalizer.

4. The codec of claim 2 wherein said equalizer further comprises a decision feedback equalizer.

5. The codec of claim 1 wherein said training unit further comprises a modem, and wherein said codec further comprises a modem for control and data communications between said training unit and said codec.

6. The codec of claim 1 wherein said equalizer comprises a plurality of equalizers, each trained to process one PCM symbol in a repeating group of PCM symbols from said ADC.

7. A telecommunications system comprising:

a PCM modem;

a central office (CO) switch communicating with said PCM modem over a digital network, said CO switch having a CO clock;

a CO line interface connected to said CO switch having:
  (a) a digital-to-analog converter (DAC) controlled by said CO clock converting digital data received from said PCM modem into an analog signal; and
  (b) a reconstruction filter limiting the bandwidth of said analog signal output by said DAC;

a training unit transmitting a predetermined sequence of training signals through said CO line interface; and a digital loop carrier (DLC) having a central office terminal (COT) with an analog connection to said CO line interface, said COT including a codec having:
  (a) an analog-to-digital converter (ADC) synchronized to the CO clock for converting analog signals from the CO line interface into corresponding digital signals;
  (b) an equalizer having an operational mode in which said equalizer receives said digital signals from said ADC and provides a transfer function to substantially compensate for distortions introduced by said CO line interface reconstruction filter and the signal path from said CO line interface reconstruction filter to said ADC; said equalizer also having a training mode in which said equalizer is connected to said training unit, receives the training signals, and adjusts predetermined equalizer parameters to more accurately compensate for said distortions; and
  (c) a PCM converter converting the output of said equalizer to output digital data over said DLC that reproduces the digital data entering the CO line interface.

8. The system of claim 7 wherein said equalizer comprises a feed-forward linear equalizer.

9. The system of claim 8 wherein said feed-forward linear equalizer comprises a fractionally-spaced equalizer.

10. The system of claim 7 wherein said equalizer further comprises a decision feedback equalizer.

11. The system of claim 7 wherein said equalizer comprises a plurality of equalizers, each trained to process one PCM symbol in a repeating group of PCM symbols from said ADC.

12. The codec of claim 7 wherein said training unit further comprises a modem, and wherein said codec further comprises a modem for control and data communications between said training unit and said codec.

13. A method for supporting communications with a PCM modem over a digital loop carrier (DLC) having an analog connection to a central office (CO) line interface, said CO line interface having a digital-to-analog converter (DAC), a clock controlling the DAC, and a reconstruction filter; said CO line interface further providing a connection to a training unit transmitting a predetermined set of training signals through said CO line interface; said method comprising:

in an operational mode:
  (a) converting analog signals from the CO line interface into corresponding digital signals at a sampling rate synchronized to the CO clock;
  (b) equalizing said digital signals using an adaptive equalizer to process said digital data and provide a transfer function to substantially compensate for distortion introduced by said CO reconstruction filter and the signal path from said CO reconstruction filter over said analog connection; and
  (c) sampling the output of said adaptive equalizer to output digital data over said DLC that reproduces the digital data entering the CO line interface; and in a training mode:
  (a) establishing a communications link between said training unit and said adaptive equalizer;
  (b) transmitting said training sequence from said training unit to said adaptive equalizer; and
  (c) adjusting predetermined equalizer parameters to more accurately compensate for said distortion.

14. The method of claim 13 wherein said adaptive equalizer comprises a feed-forward linear equalizer.

15. The method of claim 14 wherein said feed-forward linear equalizer comprises a fractionally-spaced equalizer.

16. The method of claim 13 wherein said adaptive equalizer further comprises a decision feedback equalizer.

17. The method of claim 13 wherein said adaptive equalizer comprises a plurality of adaptive equalizers, each trained to process one PCM symbol in a repeating group of PCM symbols from said analog-to-digital conversion step.

18. The method of claim 13 wherein said communications link between said training unit and said codec is established by a dial-up connection over a public switched telephone network.

\* \* \* \* \*